United States Patent
Kuo et al.

(10) Patent No.: US 8,737,416 B2
(45) Date of Patent: May 27, 2014

(54) ACCESS LINK AGGREGATOR

(75) Inventors: Richard T. Kuo, Naperville, IL (US); James Fan, San Ramon, CA (US); Srilal Weerasinghe, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 1586 days.

(21) Appl. No.: 11/949,931

(22) Filed: Dec. 4, 2007

(65) Prior Publication Data
US 2009/0141702 A1    Jun. 4, 2009

(51) Int. Cl.
 H04L 12/28    (2006.01)
 H04L 12/56    (2011.01)
 H04J 1/16    (2006.01)
 H04J 3/14    (2006.01)

(52) U.S. Cl.
 USPC ............................ 370/420; 370/216; 370/412

(58) Field of Classification Search
 USPC ............. 370/230, 351, 420, 216, 395.53, 412
 See application file for complete search history.

(56) References Cited

U.S. PATENT DOCUMENTS

| | | | | |
|---|---|---|---|---|
| 4,956,835 | A  * | 9/1990 | Grover | 370/228 |
| 6,075,766 | A  * | 6/2000 | Croslin | 370/225 |
| 6,778,525 | B1 * | 8/2004 | Baum et al. | 370/351 |
| 7,433,953 | B1 * | 10/2008 | Kappler et al. | 709/226 |
| 8,520,530 | B2 * | 8/2013 | Mohan | 370/241 |
| 2002/0114276 | A1 * | 8/2002 | Basturk | 370/230 |
| 2005/0138212 | A1 * | 6/2005 | Yang | 709/250 |
| 2005/0220014 | A1 * | 10/2005 | DelRegno et al. | 370/230 |
| 2006/0268856 | A1 * | 11/2006 | Voit et al. | 370/389 |
| 2006/0291378 | A1 * | 12/2006 | Brotherston et al. | 370/221 |
| 2007/0041321 | A1 * | 2/2007 | Sasaki et al. | 370/235 |
| 2007/0124464 | A1 * | 5/2007 | Lean et al. | 709/224 |
| 2008/0068983 | A1 * | 3/2008 | Dunbar et al. | 370/216 |
| 2008/0069006 | A1 * | 3/2008 | Walter et al. | 370/252 |
| 2008/0130494 | A1 * | 6/2008 | Kaluskar | 370/229 |
| 2008/0181196 | A1 * | 7/2008 | Regan et al. | 370/351 |
| 2009/0073989 | A1 * | 3/2009 | Cai et al. | 370/395.53 |
| 2009/0225675 | A1 * | 9/2009 | Baum et al. | 370/252 |
| 2010/0046536 | A1 * | 2/2010 | Wright et al. | 370/412 |

* cited by examiner

*Primary Examiner* — Ayaz Sheikh
*Assistant Examiner* — Hoang-Chuong Vu
(74) *Attorney, Agent, or Firm* — Greenblum & Bernstein, P.L.C.

(57) ABSTRACT

One or more virtual access nodes manage multiple physical links connecting a digital subscriber line access multiplexer and an intelligent network interface device by logically bonding physical ports together into a group. Physical ports bonded in a logical group have equal priority with respect to one another. Thus, no master-slave relationship exists between the physical ports in the logical group. Traffic associated with a site is transmitted over physical links associated with the logical group of physical ports to a customer premises network interface device. The customer premises network interface device subsequently aggregates the received traffic and provides an increased bandwidth to the site over the physical links. The quality of communication is based on the number of operational physical links associated with the logical group. As long as at least one physical link associated with the logical group remains operational, communication will be enabled.

20 Claims, 5 Drawing Sheets

ACCESS LINK AGGREGATOR

BACKGROUND OF THE DISCLOSURE

1. Field of the Disclosure

The present disclosure relates to providing increased bandwidth to a site using access physical links. More particularly, the present disclosure relates to logically bonding the physical ports available to a site into a group and sending data to and receiving data from the site over the physical links associated with the logically bonded group of physical ports.

2. Background Information

Currently, access network technologies providing end-to-end connections include fiber to the premises (FTTp) and fiber to the neighborhood (FTTn). Fiber to the premises technology is typically deployed in optical fiber networks employing passive optical network (PON) technology to provide connections to customer premises equipment (CPE) devices. On the other hand, fiber to the neighborhood technology leverages the existing copper wires connecting customer premises equipment devices to a digital subscriber line access multiplexer (DSLAM). Although current technologies (e.g., asymmetric digital subscriber line technology) provide a subscriber with enhanced data rates over copper wires, the bandwidth provided and the distance over which data is carried is effectively limited.

To address these limitations, two copper pair wires have been bonded together to increase the bandwidth available to a subscriber in an approach known as "pair bonding." In the pair bonding approach, a network link assignment system tags one copper pair as a master link and a second copper pair as a slave link. Next, an installer manually plugs the master link into the master port and the slave link into the slave port on a subscriber's intelligent network interface device (iNID) at a subscriber location. Additionally, the master link is connected to the master port and the slave link is connected to the slave port on the digital subscriber line access multiplexer. The digital subscriber line access multiplexer carries traffic through both the master port over the master link and the slave port over the slave link, only as long as the master port is operative. If the master port becomes inoperative, traffic will not be transmitted.

ACRONYMS AND DEFINITIONS

DSLAM (digital subscriber line access multiplexer)—a network device that receives relatively low speed data signals over digital subscriber lines from several subscribers and multiplexes the data signals onto a higher speed link, such as that of a backbone network iNID (intelligent network interface device)—a device that facilitates communications between a customer premises equipment device and a network by performing interface functions including code conversion, protocol translation and buffering

BRIEF DESCRIPTION OF THE DRAWINGS

The present disclosure is further described in the detailed description that follows, by reference to the noted drawings by way of non-limiting examples of embodiments of the present disclosure, in which like reference numerals represent similar parts throughout several views of the drawing, and in which.

DETAILED DESCRIPTION

Figure 1:
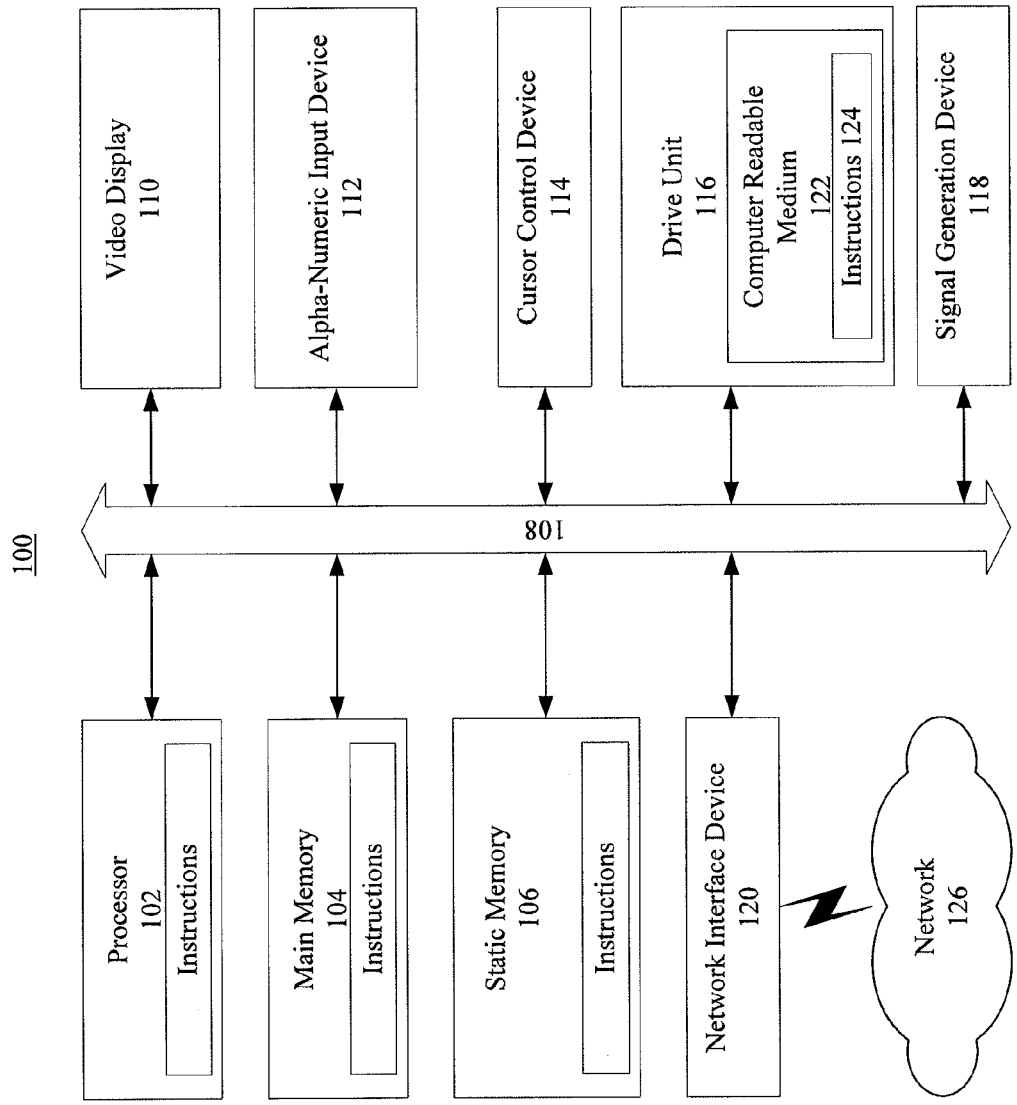
FIG. 1 illustrates an embodiment of a general computer system.

In view of the foregoing, the present disclosure, through one or more of its various aspects, embodiments and/or specific features or sub-components, is thus intended to bring out one or more of the advantages as specifically noted below.

According to an aspect of the present disclosure, an access node includes multiple logically bonded physical ports by which traffic is communicated over multiple corresponding physical links to a customer premises network interface (CPNI) device. A processor logically bonds the multiple physical ports in order to transmit the traffic by the multiple physical ports.

According to another aspect of the present disclosure, the access node may be, for example, a digital subscriber line access multiplexer, a host digital terminal (HDT) or an optical line terminal (OLT).

According to yet another aspect of the present disclosure, the customer premises network interface device may be an intelligent network interface device.

According to a further aspect of the present disclosure, the physical links may be, for example, copper wires, coaxial cable or optical fiber links.

According to an aspect of the present disclosure, the access node further includes multiple virtual access nodes (VANs) which are each established by logically bonding the multiple physical ports.

According to another aspect of the present disclosure, the multiple logically bonded physical ports associated with the multiple virtual access nodes do not have a master-slave relationship.

According to yet another aspect of the present disclosure, communication by a virtual access node is not interrupted as long as at least one physical port associated with the virtual access node is operational.

According to a further aspect of the present disclosure, communication is adjusted to maintain communication of traffic by the at least one operational physical port.

According to yet another aspect of the present disclosure, quality of service associated with at least one service communicated over the multiple physical links is adjusted.

According to an aspect of the present disclosure, a customer premises network interface device includes multiple logically bonded physical ports by which traffic is communicated over multiple, corresponding physical links to an access node. A processor logically bonds the multiple physical ports for communicating the traffic by the multiple physical ports.

According to another aspect of the present disclosure, the customer premises network interface device includes multiple virtual access nodes which are each established by logically bonding the multiple physical ports.

According to yet another aspect of the present disclosure, the multiple logically bonded physical ports associated with the multiple virtual access nodes do not have a master-slave relationship.

According to a further aspect of the present disclosure, communication by a virtual access node is not interrupted as long as at least one physical port associated with the virtual access node is operational.

According to an aspect of the present disclosure, communication is adjusted to maintain communication of traffic by the at least one operational physical port.

According to another aspect of the present disclosure, the customer premises network interface device may be an intelligent network interface device.

According to yet another aspect of the present disclosure, the access node may be, for example, a digital subscriber line access multiplexer, a host digital terminal or an optical line terminal.

According to a further aspect of the present disclosure, the physical links may be, for example, copper wires, coaxial cable or optical fibers links.

According to an aspect of the present disclosure, the processor aggregates the traffic communicated over the multiple physical links.

According to another aspect of the present disclosure, the customer premises network interface device includes at least one site-facing physical port associated with the virtual access node. The at least one site-facing physical port communicates the aggregated traffic to at least one customer premises equipment device. The customer premises network interface device also includes multiple network-facing physical ports associated with the virtual access node. The multiple network-facing physical ports communicate the traffic over the multiple physical links.

According to yet another aspect of the present disclosure, the processor includes at least one site-facing virtual port corresponding to the at least one site-facing physical port. The processor also includes multiple network-facing virtual ports corresponding to the multiple network-facing physical ports. The processor further includes a module that reassembles the traffic communicated over the multiple network-facing virtual ports.

According to an aspect of the present disclosure, bandwidth associated with multiple physical links in a network is aggregated. Multiple physical ports of an access node are logically bonded for communicating traffic, over multiple corresponding physical links, to a customer premises network interface device.

According to an aspect of the present disclosure, bandwidth associated with multiple physical links in a network is aggregated. The traffic is communicated over multiple physical links from multiple logically bonded physical ports of an access node. The traffic is aggregated. The traffic is communicated to at least one customer premises equipment device. The at least one customer premises equipment device is provided with an aggregate bandwidth associated with the multiple physical links.

According to an aspect of the present disclosure, a tangible computer readable medium contains a computer program, executable by a computer, for aggregating bandwidth associated with multiple physical links in a network. The tangible computer readable medium includes a bonding code for logically bonding multiple physical ports, a management code for queuing and scheduling traffic for communication and a transmission code for communicating the traffic by the multiple logically bonded physical ports over the multiple physical links to a device.

In FIG. 1, an illustrative embodiment of a general computer system is shown and is designated 100. The computer system 100 can include a set of instructions that can be executed to cause the computer system 100 to perform any one or more of the methods or computer based functions disclosed herein. The computer system 100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 102, e.g., a central processing unit (CPU), a graphics processing unit (GPU), or both. Moreover, the computer system 100 can include a main memory 104 and a static memory 106, that can communicate with each other via a bus 108. As shown, the computer system 100 may further include a video display unit 110, such as a liquid crystal display (LCD), an organic light emitting diode (OLED), a flat panel display, a solid state display, or a cathode ray tube (CRT). Additionally, the computer system 100 may include an input device 112, such as a keyboard, and a cursor control device 114, such as a mouse. The computer system 100 can also include a disk drive unit 116, a signal generation device 118, such as a speaker or remote control, and a network interface device 120.

In a particular embodiment, as depicted in FIG. 1, the disk drive unit 116 may include a computer-readable medium 122 in which one or more sets of instructions 124, e.g. software, can be embedded. Further, the instructions 124 may embody one or more of the methods or logic as described herein. In a particular embodiment, the instructions 124 may reside completely, or at least partially, within the main memory 104, the static memory 106, and/or within the processor 102 during execution by the computer system 100. The main memory 104 and the processor 102 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 124 or receives and executes instructions 124 responsive to a propagated signal, so that a device connected to a network 126 can communicate voice, video or data over the network 126. Further, the instructions 124 may be transmitted or received over the network 126 via the network interface device 120.

Figure 2:
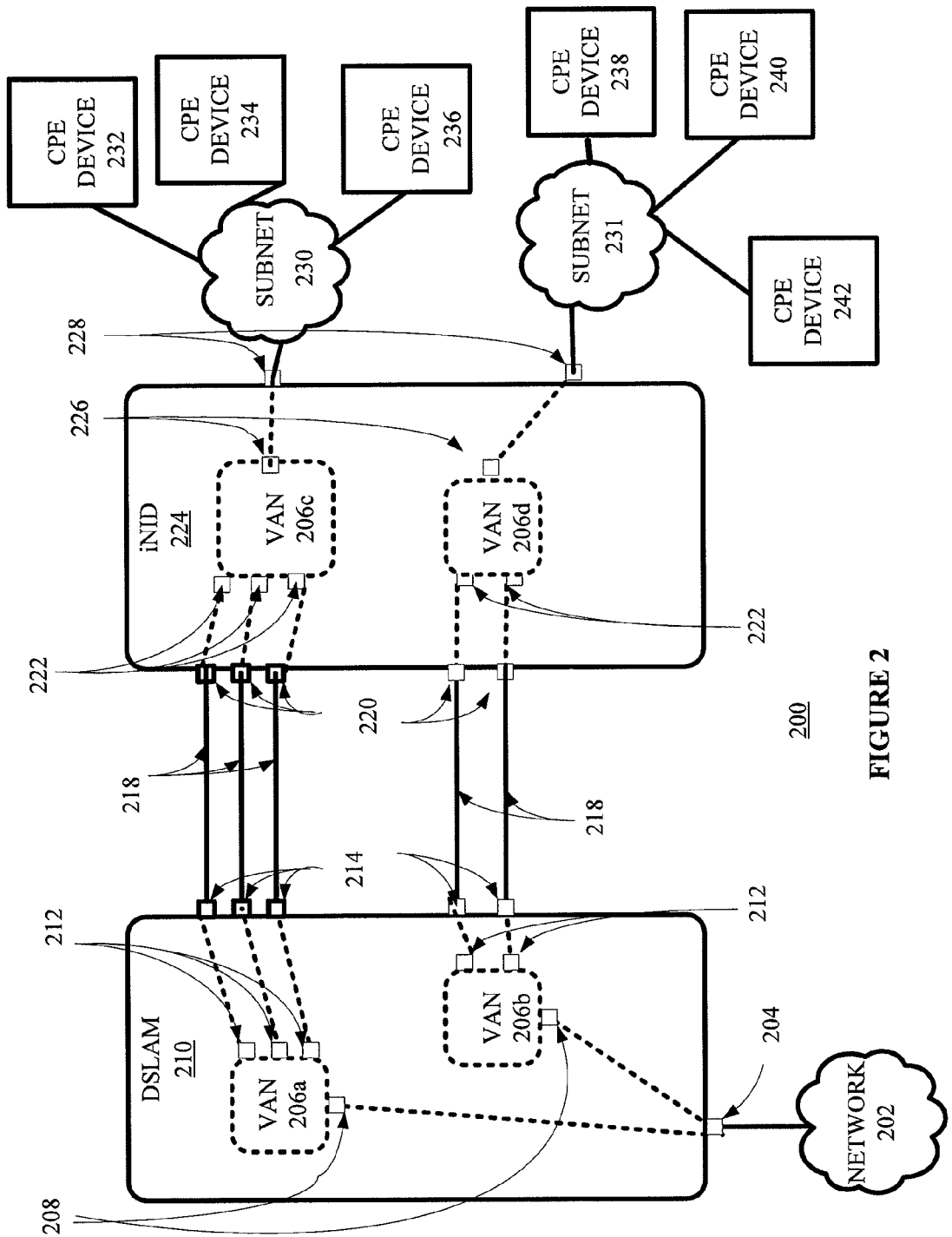
FIG. 2 illustrates a network diagram implementing multiple virtual access nodes.

In FIG. 2, a network diagram 200 implementing multiple virtual access nodes is shown. Network 202 is connected to digital subscriber line access multiplexer network-facing physical port 204. Digital subscriber line access multiplexer network-facing physical port 204 is associated with one or more corresponding network-facing virtual ports 208 of access virtual access nodes 206a and 206b. Access virtual access nodes 206a and 206b are instantiated on digital subscriber line access multiplexer 210 and include site-facing virtual ports 212 corresponding to digital subscriber line access multiplexer site-facing physical ports 214 connected to physical links 218. Digital subscriber line access multiplexer site-facing physical ports 214 are bonded into a logical group. In one embodiment, physical links 218 are copper pair wires connecting digital subscriber line access multiplexer 210 with intelligent network interface device 224 via intelligent network interface device network-facing physical ports 220 and network-facing virtual ports 222 of site virtual access nodes 206c and 206d. Site-facing virtual ports 226 of site virtual access node 206c and 206d are associated with intelligent network interface device site-facing physical ports 228. Traffic is transmitted over intelligent network interface device site-facing physical ports 228 to subnets 230 and 231, each of which are associated with a site. Traffic is subsequently transmitted from subnet 230 to associated customer premises equipment devices 232, 234 and 236 and from subnet 231 to associated customer premises equipment devices 238, 240 and 242. It is noted that the present disclosure is not limited to instantiation of one or more virtual access node on an intelligent network interface device or a digital subscriber line access multiplexer. Rather, one or more virtual access nodes may be instantiated on other access network devices.

Figure 3:
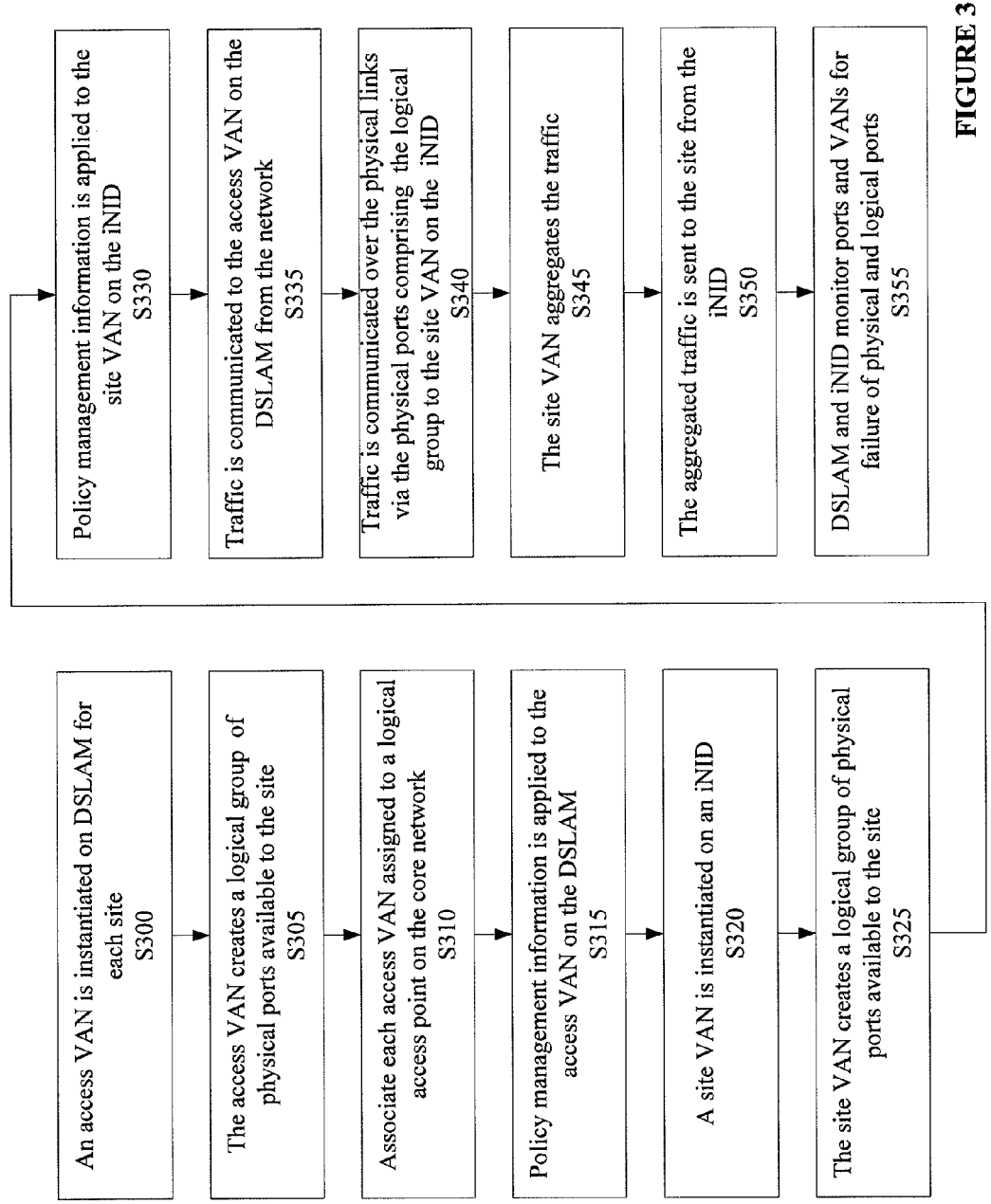
FIG. 3 is an exemplary process flow diagram for a system implementing multiple virtual access nodes.

Shown in FIG. 3 is a process flow diagram illustrating transmitting and receiving traffic over physical links associated with a group logically bonded physical ports. Initially, in step S300, an access virtual access node is instantiated on the digital subscriber line access multiplexer for each site. Next, in step S305, the access virtual access node creates a logical group of digital subscriber access multiplexer site-facing physical ports available to the site. In step S310, the access virtual access node assigned to the site is associated with a logical access point on the core network. In step S315, policy management information is applied to the access virtual access node. Policy management information may include such information as quality of service (QoS) requirements for traffic associated with the site.

In step S320, a site virtual access node is instantiated on an intelligent network interface device (i.e., a residential gateway). Next in step S325, the site virtual access node creates a logical group of the physical ports corresponding to physical links available to the site. For example, a site may be connected to physical links such as a copper pair and one or more spare copper pair wires. A single logical group would include the physical ports connected to the copper pair and the spare copper pair or pairs. Subsequently, in step S330, policy management information is applied to the site virtual access node.

In step S335, network traffic is received by the access virtual access node instantiated on the digital subscriber line access multiplexer. Next in step S340, the traffic is transmitted over the physical links corresponding to the physical ports forming the logical group to the site virtual access node on the intelligent network interface device. In other words, if there are three copper pairs available to the site, all three pairs are utilized in transmitting traffic to the site.

In step S345, the traffic is received at the intelligent network interface device and subsequently, the site virtual access node aggregates the traffic. The process continues to step 350 in which the aggregated traffic is sent to the site. Finally, in step S355, both the intelligent network interface device and the digital subscriber line access multiplexer monitor the state of associated logical and physical ports as well as virtual access nodes. If a physical link fails, an event is triggered to notify both digital subscriber line access multiplexer and intelligent network interface device to adjust the configuration of the logical group and associated policy management information. When a physical link fails, an alarm will be triggered which will provide information regarding the failure (i.e., virtual access node identifier, port identifier and timestamp) for troubleshooting. When a physical link becomes operational after failure, the physical port associated with the physical link rejoins the logical group and the process repeats from step S335.

Figure 4:
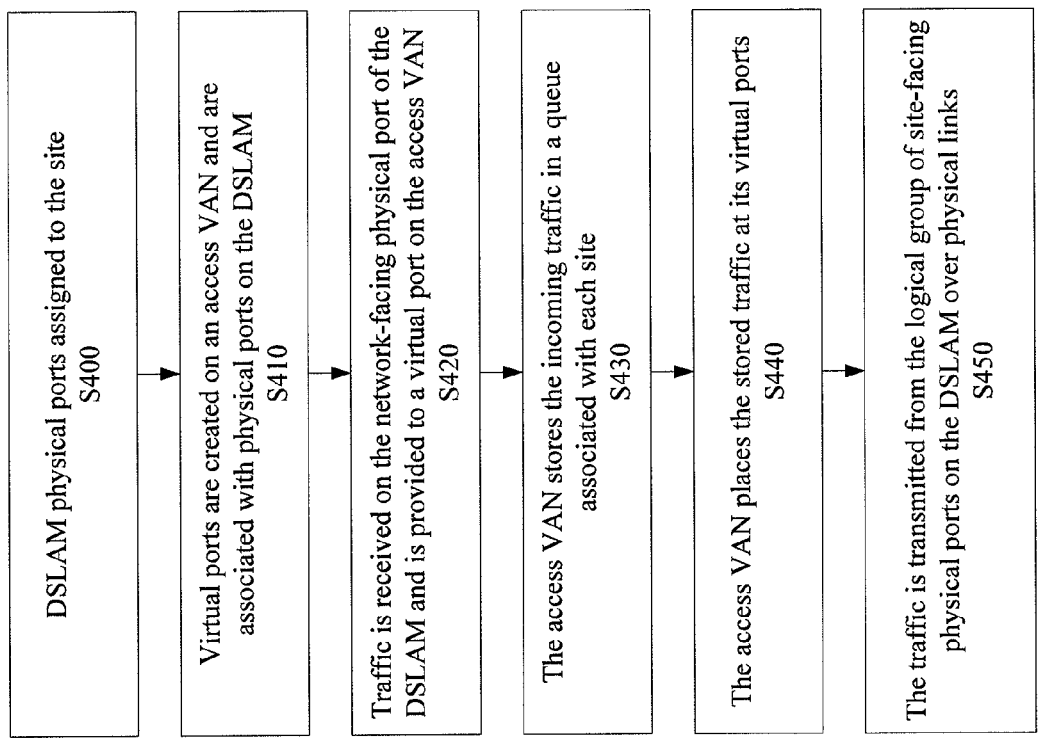
FIG. 4 is an exemplary process flow diagram for communicating traffic at a digital subscriber line access multiplexer.

Shown in FIG. 4 is a process flow diagram illustrating the operation of a digital subscriber line access multiplexer of the present disclosure. Initially, in step S400, at least one digital subscriber line access multiplexer site-facing physical port is assigned to the site. Continuing to step S410, virtual ports are created on an access virtual access node and are associated with physical ports on the digital subscriber line access multiplexer. Specifically, each of the site-facing physical ports on the digital subscriber line access multiplexer are associated with a corresponding virtual port on the access virtual access node instantiated on the digital subscriber line access multiplexer. Additionally, a network-facing physical port on the digital subscriber line access multiplexer is associated with at least one virtual port on the access virtual access node.

Subsequently, in step S420, traffic received at the digital subscriber line access multiplexer network-facing physical port is provided to at least one virtual port for processing by the access virtual access node. The access virtual access node stores the incoming traffic in a set of queues associated with each site, each queue having predetermined priorities to satisfy quality of service requirements in step S430. In step S440, the access virtual access node places the stored traffic at its site-facing virtual ports corresponding to the site-facing physical ports of the digital subscriber line access multiplexer. Finally, in step S450, the traffic is transmitted from the logical group of digital subscriber line access multiplexer site-facing physical ports over the physical links associated with the site, the traffic being transmitted to the intelligent network interface device.

Figure 5:
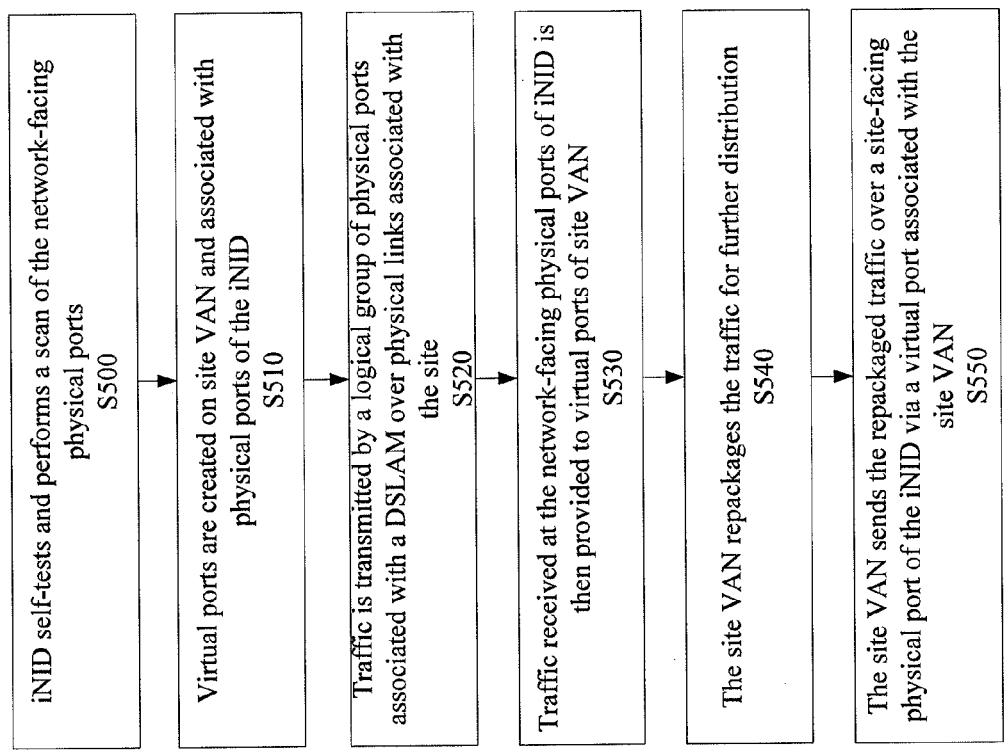
FIG. 5 is an exemplary process flow diagram for communicating traffic at an intelligent network interface device.

In FIG. 5, a process flow diagram illustrating the operation of an intelligent network interface device of the present disclosure is shown. Initially, in step S500, the intelligent network interface device self-tests and performs a scan of the network-facing physical ports to determine the number of ports that are connected to physical links. Based on the scan at the physical level, the intelligent network interface device verifies the available physical links connected to the digital subscriber line access multiplexer. Subsequently in step S510, virtual ports are created on a site virtual access node and are associated with physical ports on the intelligent network interface device. Specifically, network-facing physical ports on the intelligent network interface device are associated with corresponding network-facing virtual ports on the site virtual access node instantiated on the intelligent network interface device. The intelligent network interface device achieves the association by performing an authentication process for each physical port on the intelligent network interface device and retrieving both physical link identifiers (e.g., copper circuit identifiers) and digital subscriber line access multiplexer physical port identifiers from a network inventory management system. Additionally in step S510, a site-facing physical port on the intelligent network interface device is associated with the site-facing virtual port on the site virtual access node. The site-facing virtual port on the site virtual access node is used to provide network services to the customer premises equipment devices associated with the site.

In step S520, the traffic is transmitted by a logical group of digital subscriber line access multiplexer site-facing physical ports over physical links associated with the site. In step S530, traffic received at the network-facing physical ports of the intelligent network interface device is provided to the network-facing virtual ports of the site virtual access node for processing. Next in step S540, the site virtual access node aggregates the received traffic associated with the site (i.e., traffic transmitted over each physical link). Also in step S540, the site virtual access node repackages the traffic for further distribution. Finally, in step S550, the site virtual access node sends the repackaged traffic to the site by the site-facing physical port of the intelligent network interface device via the site-facing virtual port associated with the site virtual access node.

The Digital Subscriber Line Access Multiplexer Virtual Access Node Logical Identifier In one embodiment of the present disclosure, a logical port identifier for each virtual access node associated with the digital subscriber line access multiplexer is used for authentication in certain protocols and also for association with one or more virtual connections in an aggregation switch or router. In another embodiment, a logical identifier for the access virtual access node and a digital subscriber line access multiplexer physical port identifier is used to complete the authentication process. For example, a digital subscriber line access multiplexer name (e.g., SanFran02) in combination with a unique digit representing a virtual access node (e.g., 01) and a number of ports (e.g., 03) creates a logical identifier. The logical identifier, "SanFran020103" indicates a path beginning with the digital subscriber line access multiplexer SanFran02 and the virtual access node 01 having three physical ports bonded together in a logical group. The digital subscriber line access multiplexer maintains a mapping of the logical identifier to the digital subscriber line access multiplexer physical ports.

The Intelligent Network Interface Device Virtual Access Node Logical Identifier

In yet another embodiment of the present disclosure, a virtual access node instantiated on an intelligent network interface device is logically identified by either or both a media access control (MAC) address and a device identifier. For example, a logical identifier for the virtual access node instantiated on the intelligent network interface device may include a media access control address and one or more port identifiers. The logical identifier "xxxxx01-03" indicates that ports 1 and 3 of a intelligent network interface device having the media access control address xxxxx are bonded into a logical group. The logical identifier for the virtual access node instantiated on the intelligent network interface device indicates that port 2 is not a part of the logical group.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. An access node, comprising:
   a logically bonded plurality of physical ports by which traffic is communicated over a corresponding plurality of physical links to a customer premises network interface (CPNI) device;
   a processor configured to logically bond the plurality of physical ports for transmitting the traffic by the plurality of physical ports; and
   a plurality of virtual access nodes (VANs), which are each established by logically bonding the plurality of physical ports,
   wherein policy management information, including quality of service requirements, is applied to each of the plurality of virtual access nodes,
   wherein each of the plurality of virtual access nodes stores traffic in a set of queues, with the set of queues for each of the plurality of virtual access nodes having priorities provided by the quality of service requirements,
   wherein a logical port identifier for each virtual access node associated with a digital subscriber line access multiplexer is used for authentication in designated protocols and for association with virtual connections in an aggregation switch, and
   wherein when there is a failure in one of the plurality of physical links, an event is triggered that adjusts a configuration of the logically bonded plurality of physical ports and the policy management information, and an alarm is triggered that provides information regarding the failure, including a virtual access node identifier, a physical port identifier, and a timestamp.

2. The access node according to claim 1,
   wherein the access node comprises one of: a digital subscriber line access multiplexer (DSLAM), a host digital terminal (HDT) and an optical line terminal (OLT).

3. The access node according to claim 1,
   wherein the customer premises network interface device comprises an intelligent network interface (iNID) device.

4. The access node according to claim 1,
   wherein the plurality of physical links comprise one of: copper wires, coaxial cable and optical fiber links.

5. The access node according to claim 1,
   wherein the logically bonded plurality of physical ports associated with the plurality of virtual access nodes do not have a master-slave relationship.

6. The access node according to claim 5,
   wherein communication by a virtual access node is not interrupted as long as at least one physical port associated with the virtual access node is operational.

7. The access node according to claim 6,
   wherein communication is adjusted to maintain communication of traffic by the at least one operational physical port.

8. A customer premises network interface (CPNI) device, comprising:
   a logically bonded plurality of physical ports by which traffic is communicated over a corresponding plurality of physical links to an access node; and
   a processor configured to logically bond the plurality of physical ports for communicating the traffic by the plurality of physical ports,
   wherein communication by a virtual access node associated with the access node is not interrupted as long as at least one physical port associated with the virtual access node is operational,
   wherein policy management information, including quality of service requirements, is applied to the virtual access node,
   wherein the virtual access node stores the traffic in a set of queues, with the set of queues having priorities provided by the quality of service requirements,
   wherein a logical port identifier for each the virtual access node associated with a digital subscriber line access multiplexer is used for authentication in designated protocols and for association with virtual connections in an aggregation switch, and
   wherein when there is a failure in one of the plurality of physical links, an event is triggered that adjusts a configuration of the logically bonded plurality of physical ports and the policy management information, and an alarm is triggered that provides information regarding the failure, including a virtual access node identifier, a physical port identifier, and a timestamp.

9. The customer premises network interface device according to claim 8, further comprising:
   a plurality of virtual access nodes (VANs) which are each established by logically bonding the plurality of physical ports.

10. The customer premises network interface device according to claim 9,
    wherein the logically bonded plurality of physical ports associated with the plurality of virtual access nodes do not have a master-slave relationship.

11. The customer premises network interface device according to claim 8,
    wherein communication is adjusted to maintain communication of traffic by the at least one operational physical port.

12. The customer premises network interface device according to claim 8,
    wherein the customer premises network interface device comprises an intelligent network interface (iNID) device.

13. The customer premises network interface device according to claim 8,
    wherein the access node comprises a digital subscriber line access multiplexer (DSLAM), a host digital terminal (HDT) and an optical line terminal (OLT).

14. The customer premises network interface device according to claim 8,
wherein the plurality of physical links comprise one of: copper wires, coaxial cable and optical fibers links.

15. The customer premises network interface device according to claim 8,
wherein the processor is configured to aggregate the traffic communicated over the plurality of physical links.

16. The customer premises network interface device according to claim 15, further comprising:
at least one site-facing physical port associated with the virtual access node, the at least one site-facing physical port configured to communicate the aggregated traffic to at least one customer premises equipment (CPE) device; and
a plurality of network-facing physical ports associated with the virtual access node, the plurality of network-facing physical ports configured to communicate the traffic over the plurality of physical links.

17. The customer premises network interface device according to claim 16,
wherein the processor comprises:
at least one site-facing virtual port corresponding to the at least one site-facing physical port;
a plurality of network-facing virtual ports corresponding to the plurality of network-facing physical ports; and
a module configured to reassemble the traffic communicated over the plurality of network-facing virtual ports.

18. A method for aggregating bandwidth associated with a plurality of physical links in a network, the method comprising:
logically bonding a plurality of physical ports of an access node for communicating by the plurality of physical ports over a corresponding plurality of physical links; and
communicating traffic from the logically bonded plurality of physical ports over the plurality of physical links to a customer premises network interface (CPNI) device,
wherein communication by a virtual access node associated with the access node is not interrupted as long as at least one physical port associated with the virtual access node is operational,
wherein policy management information, including quality of service requirements, is applied to the virtual access node,
wherein the virtual access node stores the traffic in a set of queues, with the set of queues for the virtual access node having priorities provided by the quality of service requirements,
wherein a logical port identifier for the virtual access node associated with a digital subscriber line access multiplexer is used for authentication in designated protocols and for association with virtual connections in an aggregation switch, and
wherein when there is a failure in one of the plurality of physical links, an event is triggered that adjusts a configuration of the logically bonded plurality of physical ports and the policy management information, and an alarm is triggered that provides information regarding the failure, including a virtual access node identifier, a physical port identifier, and a timestamp.

19. A method for aggregating bandwidth associated with a plurality of physical links in a network, the method comprising:
communicating traffic over the plurality of physical links from a logically bonded plurality of physical ports of an access node; and
aggregating the traffic,
wherein the traffic is communicated to at least one customer premises equipment (CPE) device, the at least one customer premises equipment device being provided with an aggregate bandwidth associated with the plurality of physical links,
wherein communication by a virtual access node associated with the access node is not interrupted as long as at least one physical port associated with the virtual access node is operational,
wherein policy management information, including quality of service requirements, is applied to the virtual access node,
wherein the virtual access node stores the traffic in a set of queues, with the set of queues for the virtual access node having priorities provided by the quality of service requirements,
wherein a logical port identifier for each the virtual access node associated with a digital subscriber line access multiplexer is used for authentication in designated protocols and for association with virtual connections in an aggregation switch, and
wherein when there is a failure in one of the plurality of physical links, an event is triggered that adjusts a configuration of the logically bonded plurality of physical ports and the policy management information, and an alarm is triggered that provides information regarding the failure, including a virtual access node identifier, a physical port identifier, and a timestamp.

20. A non-transitory tangible computer-readable storage medium encoded with an executable computer program for aggregating bandwidth associated with a plurality of physical links in a network and that, when executed by a processor, causes the processor to perform operations comprising:
logically bonding a plurality of physical ports by which traffic is communicated over a corresponding plurality of physical links to an access node;
queuing and scheduling traffic for communication by the plurality of physical ports; and
communicating the traffic by the logically bonded plurality of physical ports over the plurality of physical links to the access node,
wherein communication by a virtual access node associated with the access node is not interrupted as long as at least one physical port associated with the virtual access node is operational,
wherein policy management information, including quality of service requirements, is applied to the virtual access node,
wherein the virtual access node stores the traffic in a set of queues, with the set of queues for the virtual access node having priorities provided by the quality of service requirements,
wherein a logical port identifier for the virtual access node associated with a digital subscriber line access multiplexer is used for authentication in designated protocols and for association with virtual connections in an aggregation switch, and
wherein when there is a failure in one of the plurality of physical links, an event is triggered that adjusts a configuration of the logically bonded plurality of physical ports and the policy management information, and an alarm is triggered that provides information regarding the failure, including a virtual access node identifier, a physical port identifier, and a timestamp.

* * * * *